(12) United States Patent
Heo et al.

(10) Patent No.: US 10,327,163 B2
(45) Date of Patent: *Jun. 18, 2019

(54) USER EQUIPMENT AND PROTOCOL AND METHODS FOR DEVICE-TO-DEVICE COMMUNICATION

(71) Applicant: Intel IP Corporation, Santa Clara, CA (US)

(72) Inventors: Youn Hyoung Heo, San Jose, CA (US); Pingping Zong, Randolph, NJ (US); Alexandre Saso Stojanovski, Paris (FR); Achim Luft, Braunschweig (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/858,429

(22) Filed: Dec. 29, 2017

(65) Prior Publication Data

US 2018/0192309 A1 Jul. 5, 2018

Related U.S. Application Data

(63) Continuation of application No. 14/914,331, filed as application No. PCT/US2014/056316 on Sep. 18, 2014, now Pat. No. 9,986,447.

(Continued)

(51) Int. Cl.
*H04W 24/04* (2009.01)
*H04L 5/00* (2006.01)
(Continued)

(52) U.S. Cl.
CPC .......... *H04W 24/04* (2013.01); *G06F 9/4856* (2013.01); *H04L 1/12* (2013.01); *H04L 1/1607* (2013.01);
(Continued)

(58) Field of Classification Search
CPC ..... H04W 24/04; H04W 24/10; H04W 76/14; H04W 76/18; H04W 76/27; H04W 76/38;
(Continued)

(56) References Cited

U.S. PATENT DOCUMENTS 8,594,632 B1 11/2013 Azizi et al.
9,603,176 B2 3/2017 Wei
(Continued)

FOREIGN PATENT DOCUMENTS

CN 103716776 A 4/2014
CN 103997727 A 8/2014
(Continued)

OTHER PUBLICATIONS

"U.S. Appl. No. 14/914,331, Non Final Office Action dated Oct. 2, 2017", 19 pgs.
(Continued)

*Primary Examiner* — Kevin D Mew
(74) *Attorney, Agent, or Firm* — Schwegman Lundberg & Woessner, P.A.

(57) ABSTRACT

Embodiments of a UE and methods for D2D communication are generally described herein. The UE may transmit, as part of an in-network communication session, a D2D discovery status message. The D2D discovery status message may indicate an initiation or termination of a D2D discovery operation at the UE and may indicate if the UE is announcing or monitoring as part of the D2D discovery operation. The D2D discovery operation may be at least partly for configuring a D2D communication session between the UE and one or more other UEs. The UE may transmit, as part of the D2D discovery operation, a D2D discovery signal for reception at one or more other UEs. The UE may transmit and receive D2D packets over a direct link to a second UE as part of the D2D communication session.

20 Claims, 6 Drawing Sheets

Related U.S. Application Data (60) Provisional application No. 61/883,127, filed on Sep. 26, 2013.

(51) Int. Cl.

| | | |
|---|---|---|
| *H04W 40/22* | (2009.01) | |
| *H04W 52/02* | (2009.01) | |
| *H04W 76/14* | (2018.01) | |
| *H04W 76/38* | (2018.01) | |
| *H04L 12/801* | (2013.01) | |
| *H04W 72/04* | (2009.01) | |
| *H04W 48/16* | (2009.01) | |
| *H04W 40/24* | (2009.01) | |
| *H04W 88/08* | (2009.01) | |
| *H04W 36/32* | (2009.01) | |
| *H04L 29/08* | (2006.01) | |
| *H04L 1/12* | (2006.01) | |
| *H04L 12/803* | (2013.01) | |
| *H04W 24/10* | (2009.01) | |
| *H04W 76/18* | (2018.01) | |
| *H04W 76/27* | (2018.01) | |
| *H04W 8/00* | (2009.01) | |
| *G06F 9/48* | (2006.01) | |
| *H04L 1/16* | (2006.01) | |
| *H04L 1/18* | (2006.01) | |
| *H04W 84/12* | (2009.01) | |
| *H04W 92/20* | (2009.01) | |
| *H04W 36/00* | (2009.01) | |

(52) U.S. Cl.
CPC .......... *H04L 1/1854* (2013.01); *H04L 1/1887* (2013.01); *H04L 5/001* (2013.01); *H04L 5/0035* (2013.01); *H04L 5/0037* (2013.01); *H04L 5/0048* (2013.01); *H04L 5/0055* (2013.01); *H04L 47/12* (2013.01); *H04L 47/122* (2013.01); *H04L 67/025* (2013.01); *H04L 67/104* (2013.01); *H04W 8/005* (2013.01); *H04W 24/10* (2013.01); *H04W 36/32* (2013.01); *H04W 40/22* (2013.01); *H04W 40/24* (2013.01); *H04W 48/16* (2013.01); *H04W 52/0274* (2013.01); *H04W 72/042* (2013.01); *H04W 72/0446* (2013.01); *H04W 72/0453* (2013.01); *H04W 76/14* (2018.02); *H04W 76/18* (2018.02); *H04W 76/27* (2018.02); *H04W 76/38* (2018.02); *H04W 88/08* (2013.01); *H04W 36/03* (2018.08); *H04W 84/12* (2013.01); *H04W 92/20* (2013.01); *Y02D 10/24* (2018.01); *Y02D 10/32* (2018.01); *Y02D 70/1224* (2018.01); *Y02D 70/1242* (2018.01); *Y02D 70/1244* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/164* (2018.01); *Y02D 70/166* (2018.01); *Y02D 70/21* (2018.01); *Y02D 70/22* (2018.01); *Y02D 70/23* (2018.01); *Y02D 70/26* (2018.01)

(58) Field of Classification Search
CPC ..... H04W 8/005; H04W 36/32; H04W 40/22; H04W 40/24; H04W 48/16; H04W 52/0274; H04W 72/042; H04W 72/0446; H04W 72/0453; H04W 88/08; H04W 84/12; H04W 92/20; H04L 1/12; H04L 1/1607; H04L 1/1887; H04L 5/001; H04L 5/0035; H04L 5/0037; H04L 5/0048; H04L 5/0055; H04L 47/12; H04L 47/122; H04L 67/025; H04L 67/104; Y02D 70/1264; Y02D 70/26; Y02D 70/1224; Y02D 70/146; Y02D 70/21; Y02D 70/22; Y02D 70/1262; Y02D 70/144; Y02D 70/1244; Y02D 70/164; Y02D 70/1242; Y02D 70/166; Y02D 70/23; Y02D 10/24; Y02D 10/32

See application file for complete search history.

(56) References Cited

U.S. PATENT DOCUMENTS

| | | | |
|---|---|---|---|
| 9,622,064 B2* | 4/2017 | Zhu | H04W 8/005 |
| 9,642,128 B2 | 5/2017 | Kim et al. | |
| 9,693,338 B2 | 6/2017 | Zhao et al. | |
| 9,781,587 B2 | 10/2017 | Fujishiro | |
| 9,788,186 B2* | 10/2017 | Chatterjee | H04W 8/005 |
| 9,820,285 B2* | 11/2017 | Xue | H04W 56/001 |
| 9,986,447 B2 | 5/2018 | Heo et al. | |
| 2012/0173623 A1* | 7/2012 | Vanderveen | H04W 8/005 |
| | | | 709/204 |
| 2013/0064138 A1 | 3/2013 | Hakola et al. | |
| 2013/0122893 A1 | 5/2013 | Turtinen et al. | |
| 2013/0155962 A1 | 6/2013 | Hakola et al. | |
| 2013/0170398 A1 | 7/2013 | Kwon | |
| 2013/0188546 A1 | 7/2013 | Turtinen et al. | |
| 2014/0003262 A1* | 1/2014 | He | H04W 28/08 |
| | | | 370/252 |
| 2014/0056220 A1 | 2/2014 | Poitau et al. | |
| 2014/0112194 A1 | 4/2014 | Novlan et al. | |
| 2014/0185530 A1* | 7/2014 | Kuchibhotla | H04W 4/90 |
| | | | 370/329 |
| 2014/0206322 A1 | 7/2014 | Dimou et al. | |
| 2014/0213186 A1* | 7/2014 | Gage | H04W 4/21 |
| | | | 455/41.2 |
| 2014/0242963 A1 | 8/2014 | Novlan et al. | |
| 2014/0269558 A1* | 9/2014 | Sartori | H04W 48/16 |
| | | | 370/329 |
| 2014/0301228 A1* | 10/2014 | Kwak | H04W 76/14 |
| | | | 370/252 |
| 2014/0335875 A1 | 11/2014 | Li et al. | |
| 2015/0043448 A1* | 2/2015 | Chatterjee | H04W 8/005 |
| | | | 370/329 |
| 2015/0098414 A1 | 4/2015 | Kuo | |
| 2015/0098416 A1* | 4/2015 | Kuo | H04W 72/10 |
| | | | 370/329 |
| 2015/0245192 A1* | 8/2015 | Wu | H04W 8/005 |
| | | | 370/329 |
| 2015/0245193 A1* | 8/2015 | Xiong | H04W 76/14 |
| | | | 370/328 |
| 2015/0264551 A1 | 9/2015 | Ko et al. | |
| 2015/0282132 A1 | 10/2015 | Kim et al. | |
| 2015/0319597 A1 | 11/2015 | Lee et al. | |
| 2015/0326373 A1* | 11/2015 | Ryu | H04L 5/0053 |
| | | | 370/330 |
| 2015/0327180 A1* | 11/2015 | Ryu | H04L 1/00 |
| | | | 370/329 |
| 2016/0192172 A1 | 6/2016 | Kim et al. | |
| 2016/0205534 A1* | 7/2016 | Fujishiro | H04W 72/048 |
| | | | 455/434 |
| 2016/0234670 A1* | 8/2016 | Zhang | H04W 8/005 |
| 2016/0234702 A1 | 8/2016 | Heo et al. | |
| 2016/0270136 A1* | 9/2016 | Liu | H04W 76/14 |
| 2017/0223760 A1* | 8/2017 | Adachi | H04W 24/10 |

FOREIGN PATENT DOCUMENTS

| | | |
|---|---|---|
| CN | 105493616 A | 4/2016 |
| JP | 2013523018 A | 6/2013 |
| JP | 2014504814 A | 2/2014 |
| JP | 2014522601 A | 9/2014 |
| JP | 6285033 B2 | 2/2018 |
| KR | 1020130035964 A | 4/2013 |
| KR | 101780609 B1 | 9/2017 |
| KR | 101903621 | 9/2018 |

(56) References Cited

FOREIGN PATENT DOCUMENTS

| WO | WO-2012088470 A1 | 6/2012 |
|---|---|---|
| WO | WO-2012166969 A1 | 12/2012 |
| WO | WO-2015047866 A1 | 4/2015 |

OTHER PUBLICATIONS

"U.S. Appl. No. 14/914,331, Notice of Allowance dated Jan. 31, 2018", 10 pgs.

"U.S. Appl. No. 14/914,331, Response filed Jan. 2, 2018 to Non Final Office Action dated Oct. 2, 2017", 12 pgs.

"Discussion on D2D Discovery with Asynchronous eNBs", NTT Docomo, Inc. 3GPP TSG-RAN WG1?74 R1-133466, (Aug. 10, 2013), 6 pgs.

"European Application Serial No. 14849472.7, Extended European Search Report dated Apr. 11, 2017", 14 pgs.

"European Application Serial No. 14849472.7, Response Filed Nov. 13, 2017 to Extended European Search Report dated Apr. 11, 2017", 15 pgs.

"International Application Serial No. PCT/US2014/056316, International Preliminary Report Patentability dated Apr. 7, 2016", 7 pgs.

"International Application Serial No. PCT/US2014/056316, International Search Report dated Dec. 18, 2014", 3 pgs.

"International Application Serial No. PCT/US2014/056316, Written Opinion dated Dec. 18, 2014", 5 pgs.

"Japanese Application Serial No. 2016-536515, Office Action dated Mar. 14, 2017", (W/ English Translation), 5 pgs.

"Japanese Application Serial No. 2016-536515, Response Filed Jun. 14, 2017 to Office Action dated Mar. 14, 2017", (W/ English Claims), 20 pgs.

"Korean Application Serial No. 2016-7004997, Office Action dated Dec. 22, 2016", W/English Translation, 11 pgs.

"Korean Application Serial No. 2016-7004997, Response filed Feb. 21, 2017 to Office Action dated Dec. 22, 2016", W/English Claims, 24 pgs.

"Protocol aspects for D2D discovery", Intel Corporation, 3GPP TSG-RAN WG2#83bis R2-133513, (Sep. 28, 2013), 5 pgs.

"Resource allocation for D2D discovery", Intel Corporation, 3GPP TSG-RAN WG2#83bis R2-133512, 3GPP, (Sep. 28, 2013), 4 pgs.

CATT, "3GPP TSG RAN WG2 Meeting #83; R2-132533; D2D discovery resource allocation within network coverage", 3GPP Draft; R2-132533 D2D Discovery Resource Allocation, 3rd Generation Partnership Project (3GPP), Mobile Competence Centre ; 650, Route Des Lucioles ; F-06921 Sophia-Antipolis Cedex ; France, vol. RAN WG2, No. Barcelona, Spain; Aug. 18, 2013-Aug. 23, 2013, [Online] retrieved from the internet: <:http://www.3gpp.org/ftp/tsg ran/WG2 RL2/TSGR2_83/Docs/>, 4 pgs.

Hong, Jongwoo, et al., "Analysis of Device-to-Device Discovery and Link Setup in LTE Networks", IEEE, (Sep. 2013).

Huawei, et al., "3GPP TSG SA WG2 Meeting 399; S2-133280; Network Triggered ProSe Direct Discovery", 3GPP Draft; S2-133280 Prose Direct Discovery(WAS S2-132542), 3rd Generation Partnership Project (3GPP), Mobile Competence Centre ; 650, Route Des Lucioles ; F-06921 Sophia-Antipolis Cedex ; France, vol. SA WG2, No. Xiamen, China; Sep. 23, 2013, Sep. 27, 2013, [Online] retrieved from the internet: <:http://www.3gpp.org/ftp/tsg_sa/WG2_Arch/TSGS2_99_Xiamen/Docs/>, (Sep. 18, 2013), 5 pgs.

"Chinese Application Serial No. 201480047301.8, Office Action dated May 28, 2018", w/ English translation, 18 pgs.

"Korean Application Serial No. 10-2017-7025807, Notice of Preliminary Rejection dated Apr. 19, 2018", w/English Translation, 4 pgs.

"Korean Application Serial No. 10-2017-7025807, Response filed Jun. 15, 2018 to Notice of Preliminary Rejection dated Apr. 19, 2018", w/ English Claims, 15 pgs.

"Japanese Application Serial No. 2018-014848, Notification of Reasons for Refusal dated Nov. 27, 2018", w English translation, 11 pgs.

"European Application Serial No. 14849472.7, Communication Pursuant to Article 94(3) EPC dated Apr. 18, 2019", 14 pgs.

"Japanese Application Serial No. 2018-014848, Response filed Feb. 25, 2019 to Notification of Reasons for Refusal dated Nov. 27, 2018", w English Claims, 19 pgs.

\* cited by examiner

USER EQUIPMENT AND PROTOCOL AND METHODS FOR DEVICE-TO-DEVICE COMMUNICATION

PRIORITY CLAIM

This application is a continuation of U.S. patent application Ser. No. 14/914,331, filed Feb. 25, 2016, which is a U.S. National Stage Filing under 35 U.C.C. 371 from International Application No. PCT/US2014/056316, filed Sep. 18, 2014 and published in English as WO 2015/047866 on Apr. 2, 2015, which claims the benefit of priority to U.S. Provisional Patent Application Ser. No. 61/883,127, filed Sep. 26, 2013, each of which are incorporated herein by reference in their entirety.

TECHNICAL FIELD

Embodiments pertain to wireless communications. Some embodiments relate to wireless networks including LTE networks. Some embodiments relate to device-to-device (D2D) communication. Some embodiments relate to D2D discovery. Some embodiments relate to proximity based services such as Pro-Se.

BACKGROUND

A cellular network may support voice, data, and other communication services for mobile devices operating in its coverage area. In some cases, demand for a high data throughput or a high loading of mobile devices may be challenging or even impossible for the network to accommodate. As an example, high loading may occur during an event in which a large number of people congregate in a geographic area, such as a sporting event in a stadium. As another example, a network that provides service to a highly populated area may experience similar challenges.

In such scenarios, it is possible that a pair or group of mobile devices communicating with each other over the network may actually be located in close proximity to each other. It may be beneficial to the network, and to devices operating in the network, for direct device-to-device (D2D) communications to be established between some of the mobile devices, if possible. Accordingly, D2D communications may alleviate device loading or demands of the network, and thus there is a need for such systems and methods.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

In some embodiments, mobile devices or other devices described herein may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the mobile device or other device can be a User Equipment (UE) or an Evolved Node-B (eNB) configured to operate in accordance with 3GPP standards. In some embodiments, the mobile device or other device may be configured to operate according to other protocols or standards, including IEEE 802.11 or other IEEE standards. In some embodiments, the mobile device or other device may include one or more of a keyboard, a display, a non-volatile memory port, multiple antennas, a graphics processor, an application processor, speakers, and other mobile device elements. The display may be an LCD screen including a touch screen.

Figure 1:
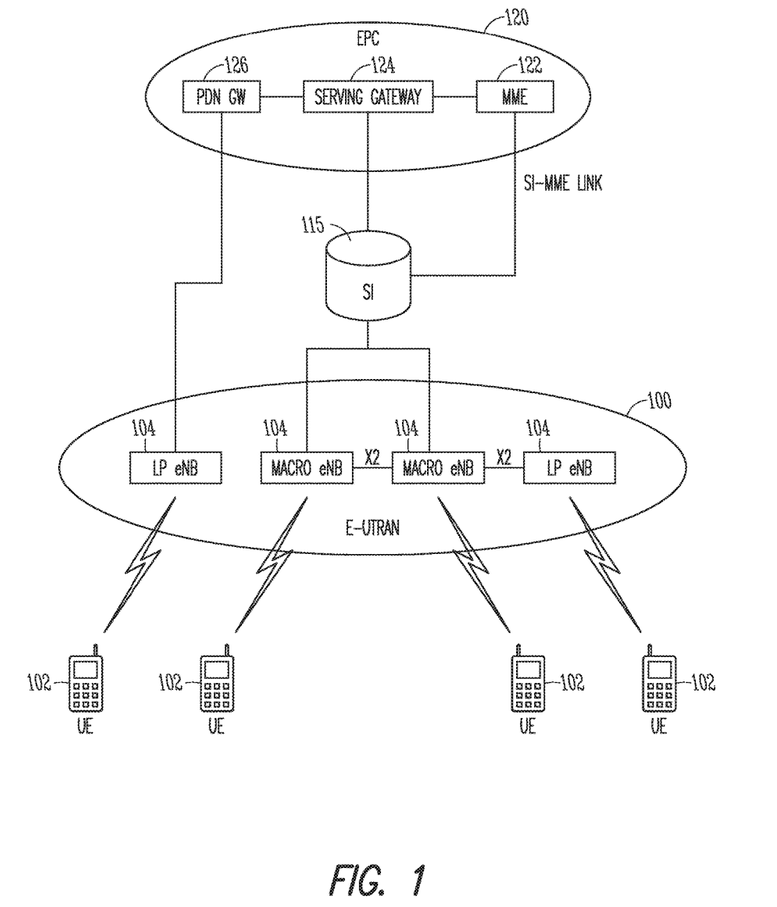
FIG. 1 is a functional diagram of a 3GPP network in accordance with some embodiments.

FIG. 1 shows a portion of an end-to-end network architecture of an LTE network with various components of the network in accordance with some embodiments. The network 100 comprises a radio access network (RAN) (e.g., as depicted, the E-UTRAN or evolved universal terrestrial radio access network) 100 and the core network 120 (e.g., shown as an evolved packet core (EPC)) coupled together through an S1 interface 115. For convenience and brevity sake, only a portion of the core network 120, as well as the RAN 100, is shown, The core network 120 includes mobility management entity (MME) 122, serving gateway (serving GW) 124, and packet data network gateway (PDN GW) 126. The RAN 100 includes Evolved Node-B's (eNBs) 104 (which may operate as base stations) for communicating with UE 102. The eNBs 104 may include macro eNBs and low power (LP) eNBs.

The MME is similar in function to the control plane of legacy Serving GPRS Support Nodes (SGSN). The MME manages mobility aspects in access such as gateway selection and tracking area list management. The serving GW 124 terminates the interface toward the RAN 100, and routes data packets between the RAN 100 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PUN GW 126 terminates an SGi interface toward the packet data network (PDN). The PUN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PUN GW 126 and the serving GW 124 may be implemented in one physical node or separated physical nodes.

The eNBs 104 (macro and micro) terminate the air interface protocol and may be the first point of contact for a UE 102. In some embodiments, an eNB 104 may fulfill various logical functions for the RAN 100 including but not limited to RNC (radio network controller functions) such as radio bearer management, uplink and downlink dynamic radio resource management and data packet scheduling, and mobility management. In accordance with embodiments, UEs 102 may be configured to communicate OFDM communication signals with an eNB 104 over a multicarrier communication channel in accordance with an OFDMA communication technique. The OFDM signals may comprise a plurality of orthogonal subcarriers.

In accordance with some embodiments, a UE 102 may transmit, for reception at an eNB 104, a D2D discovery status message that indicates an initiation or termination of a D2D discovery operation at the UE 102. In addition, the UE 102 may receive, from the eNB 104, one or more D2D resource parameters. The D2D resource parameters may be used to determine a transmission time and transmission frequency resources for use by the UE 102 during transmission of D2D discovery signals for reception at other UEs. These embodiments are described in more detail below.

The S1 interface 115 is the interface that separates the RAN 100 and the EPC 120. It is split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller, and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

In some embodiments, a downlink resource grid may be used for downlink transmissions from an eNB 104 to a UE 102, while uplink transmission from the UE 102 to the eNB 104 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame, The smallest time-frequency unit in a resource grid is denoted as a resource element. Each resource grid comprises a number of resource blocks, which describe the mapping of certain physical channels to resource elements. Each resource block comprises a collection of resource elements and in the frequency domain, this represents the smallest quanta of resources that currently can be allocated. There are several different physical downlink channels that are conveyed using such resource blocks. With particular relevance to this disclosure, two of these physical downlink channels are the physical downlink shared channel and the physical down link control channel.

The physical downlink shared channel (PDSCH) carries user data and higher-layer signaling to a UE 102 (FIG. 1). The physical downlink control channel (PDCCH) carries information about the transport format and resource allocations related to the PDSCH channel, among other things. It also informs the UE 102 about the transport format, resource allocation, and H-ARQ information related to the uplink shared channel. Typically, downlink scheduling (assigning control and shared channel resource blocks to UEs 102 within a cell) is performed at the eNB 104 based on channel quality information fed back from the UEs 102 to the eNB 104, and then the downlink resource assignment information is sent to a UE 102 on the control channel (PDCCH) used for (assigned to) the UE 102.

The PDCCH uses CCEs (control channel elements) to convey the control information. Before being mapped to resource elements, the PDCCH complex-valued symbols are first organized into quadruplets, which are then permuted using a sub-block inter-leaver for rate matching. Each PDCCH is transmitted using one or more of these control channel elements (CCEs), where each CCE corresponds to nine sets of four physical resource elements known as resource element groups (REGs). Four QPSK symbols are mapped to each REG. The PDCCH can be transmitted using one or more CCEs, depending on the size of DCI and the channel condition. There may be four or more different PDCCH formats defined in LTE with different numbers of CCEs (e.g., aggregation level, L=1, 2, 4, or 8).

Figure 2:
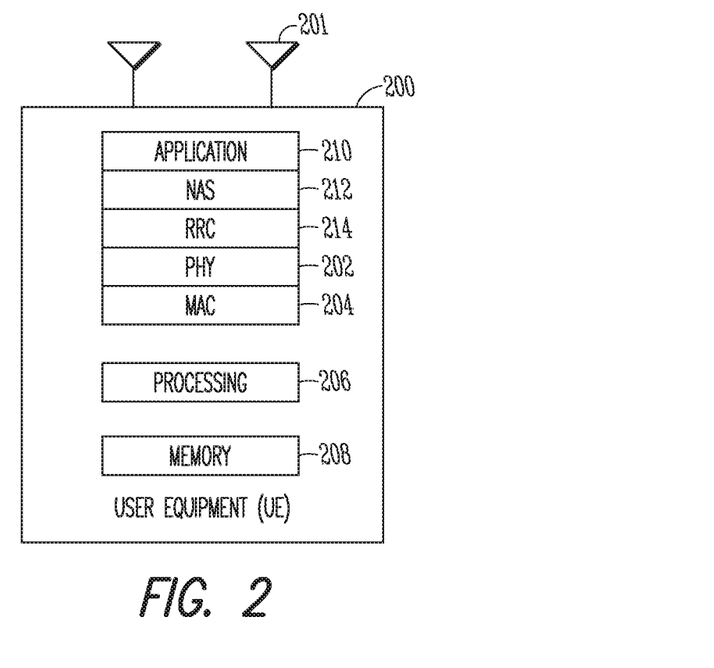
FIG. 2 is a block diagram of a User Equipment (UE) in accordance with some embodiments.
Figure 3:
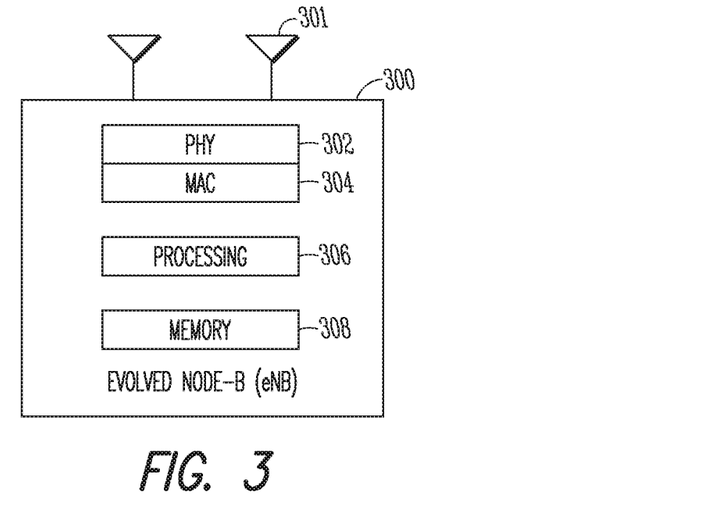
FIG. 3 is a block diagram of an Evolved Node-B (eNB) in accordance with some embodiments.

FIG. 2 shows a block diagram of a UE 200 in accordance with some embodiments, while FIG. 3 shows a block diagram of an eNB 300 in accordance with some embodiments. It should be noted that in some embodiments, the eNB 300 may be a stationary non-mobile device. The UE 200 may be a UE 102 as depicted in FIG. 1, while the eNB 300 may be an eNB 104 as depicted in FIG. 1. The UE 200 may include physical layer circuitry 202 for transmitting and receiving signals to and from the eNB 300, other eNBs, other UEs or other devices using one or more antennas 201, while the eNB 300 may include physical layer circuitry 302 for transmitting and receiving signals to and from the UE 200, other eNBs, other UEs or other devices using one or more antennas 301. The UE 200 may also include medium access control layer (MAC) circuitry 204 for controlling access to the wireless medium, while the eNB 300 may also include medium access control layer (MAC) circuitry 304 for controlling access to the wireless medium. The UE 200 may also include processing circuitry 206 and memory 208 arranged to perform the operations described herein, and the eNB 300 may also include processing circuitry 306 and memory 308 arranged to perform the operations described herein. The UE 200 may also include an application layer 210, which may provide various services for applications operating at the UE 200, as known in the art of 3GPP. In addition, the UE 200 may include a Non-Access Stratum (NAS) layer 212, which may provide management functionality for establishment of communication sessions by the UE 200, as known in the art of 3GPP. The UE 200 may also include a Radio Resource Control (RRC) layer 214 for connection establishment and mobility procedures, as known in the art of 3GPP. Although shown as separate layers, the application layer 210, NAS layer 212, RRC layer 214 and other layers may be combined or have combined functionality or implementation, in some cases.

The antennas 201, 301 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 201, 301 may be effectively separated to take advantage of spatial diversity and the different channel characteristics that may result.

Although the UE 200 and eNB 300 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

In accordance with embodiments, the UE 102 may transmit, as part of an in-network communication session, a D2D discovery status message. The D2D discovery status message may indicate an initiation or termination of a D2D discovery operation at the UE 102 and may indicate if the UE 102 is announcing or monitoring as part of the D2D discovery operation. The D2D discovery operation may be at least partly for configuring a D2D communication session between the UE 102 and one or more other UEs. The UE 102 may transmit, as part of the D2D discovery operation, a D2D discovery signal for reception at one or more other UEs. The UE 102 may transmit and receive D2D packets over a direct link to a second UE as part of the D2D communication session. These embodiments are described in more detail below.

In some scenarios, the UE 102 operating in a cellular communication network (such as 100) may begin to experience performance degradation for various reasons. As an example, user loading or throughput demands of the network may become high. While operating in the network and communicating with the eNB 104, the UE 102 may actually be in communication with other UEs that are physically located in close proximity to the UE 102, although the communication may take place through the network. In addition to, or instead of, communication through the network, it may be beneficial to the UE 102 and the system for the UE 102 to engage in direct or device-to-device (D2D) communication with one or more other UEs that may be within range of the UE 102. As an example, in the performance degradation scenarios described above, the D2D communication between the UE 102 and the other UEs may enable the network to off-load some of the network traffic, which may improve overall system performance. In some embodiments, discovery resources used for the D2D communication may be configured by the network.

Figure 4:
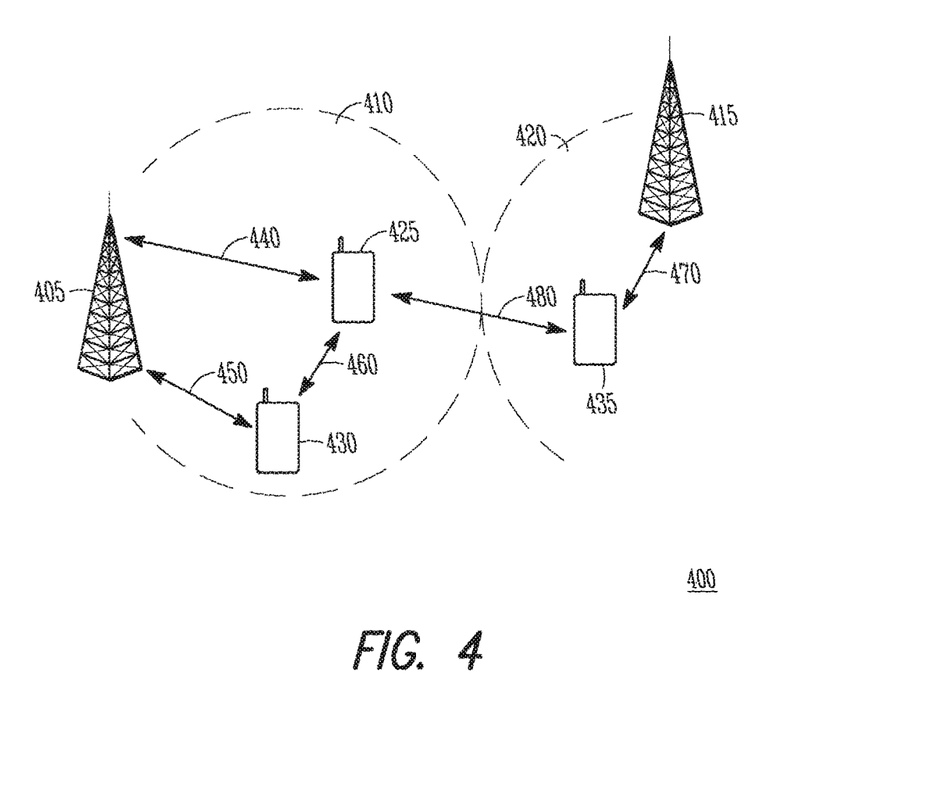
FIG. 4 is an example of a scenario in which UEs may be in communication with an eNB and with each other in accordance with some embodiments.

Referring to FIG. 4, an example scenario 400 shows a first eNB 405 that may serve the first coverage area 410 and a second eNB 415 that may serve the second coverage area 420. The UEs 425 and 430 may be in communication with the first eNB 405 over the links 440 and 450, respectively. The UE 435 may be in communication with the second eNB 415 over the link 470. These links 440, 450, 470 may be part of in-network communication sessions, which will be described below. The links between UEs 425, 430, 435 and the eNBs 405, 415 (or between any UE and any eNB, including those not shown) may be considered as in-network communication which may include, in some embodiments, communication over a Uu interface included in 3GPP or other standards. In some embodiments, a UE (such as 425, 430, 435) may start in-network communication after establishing an RRC connection with the serving eNB (such as 405, 415).

The UE 425 may also communicate with the UEs 430 and 435 over the D2D links 460 and 480, respectively. Accordingly, the UEs 425 and 430, both assigned to the first eNB 405, may be engaged in a D2D communication session. In addition, the D2D communication session over the link 480 may occur between UEs 425 and 435, which are assigned to different eNBs (405 and 415, respectively). As shown, the UEs 425 and 435, although assigned to different cells, may be in close enough proximity to engage in a D2D communication session. These embodiments will be described in more detail below.

It should be noted that techniques and operations for D2D communication such as those described above, along with D2D discovery operations and other forms of D2D communication described herein, may be included in or performed according to proximity-based services (or "Pro-Se") included in 3GPP or other standards. Accordingly, the UE 102 (or other UEs like 425, 430, 435) may be enabled for Pro-Se or other proximity-based services.

It should also be noted that the eNBs 405, 415 may be eNBs 104 while the UEs 425, 430, 435 may be UEs 102, and the in-network communication sessions may take place over a network such as 100. Techniques and scenarios discussed are not limited to the number or types of eNBs and UEs shown in the example scenario 400, as any suitable number or types may be used. For instance, the eNBs 405 and 415 are not limited to the tower configurations shown. In addition, the coverage areas 410 and 420 include circular shapes for ease of illustration, but are not so limited, and may include other shapes, such as hexagons. It is also known in the art that in some cases, coverage areas may resemble "free-form" curves that may not even be describable by shapes like circles or hexagon. In addition, in-network and D2D communication sessions, such as those described, may take place simultaneously, but may occur exclusively in other cases.

Figure 5:
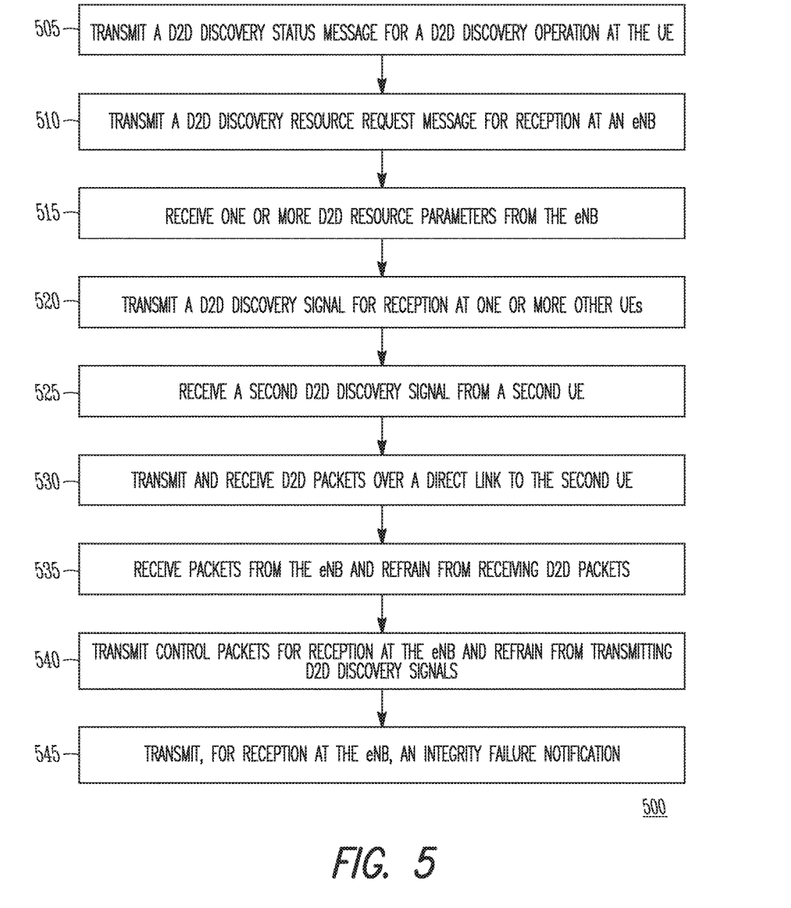
FIG. 5 illustrates the operation of a method of D2D communication in accordance with some embodiments.

Referring to FIG. 5, a method 500 of operating in accordance with a D2D communication mode is shown. It is important to note that embodiments of the method 500 may include additional or even fewer operations or processes in comparison to what is illustrated in FIG. 5. In addition, embodiments of the method 500 are not necessarily limited to the chronological order that is shown in FIG. 5. In describing the method 500, reference may be made to FIGS. 1-4, although it is understood that the method 500 may be practiced with any other suitable systems, interfaces and components. For example, reference may be made to the scenario 400 in FIG. 4 described earlier for illustrative purposes, but the techniques and operations of the method 500 are not so limited.

In addition, while the method 500 and other methods described herein may refer to eNBs 104 or UEs 102 operating in accordance with 3GPP or other standards, embodiments of those methods are not limited to just those eNBs 104 or UEs 102 and may also he practiced on other mobile devices, such as a access point (AP) or user station (STA). Moreover, the method 500 and other methods described herein may be practiced by wireless devices configured to operate in other suitable types of wireless communication systems, including systems configured to operate according to various IEEE standards such as IEEE 802.11.

As part of the method 500 and other embodiments, a D2D discovery operation performed at the UE 102 (or between the UE 102 and other UEs) may enable an initiation of or a configuration of a D2D communication session between the UE 102 and other UEs. A D2D discovery operation performed at the UE 102 (or between the UE 102 and other UEs) may enable an initiation of transmission of D2D discovery signals or messages via a direct path between the UE 102 and other UEs. The D2D discovery operation may also enable an initiation of reception of D2D discovery signals or messages via a direct path between the UE 102 and other UEs. The D2D discovery operation may also enable determination of feasibility or benefits of a potential D2D communication session between the UE 102 and other UEs. The transmission of D2D discovery signals by the UE 102 for reception at other UEs may be referred to as "announcing." The reception (or attempted reception) of D2D discovery signals at the UE 102 from other UEs may be referred to as "monitoring."

Accordingly, the D2D communication session may include exchanging of voice, data or other packets between the UE 102 and other UEs over direct connections. In some cases, the D2D discovery operation may be considered or may serve as a "setup" for the D2D communication session. In addition, the UE 102 may be engaged in an in-network communication session with the eNB 104 through a network such as 100 before, during or after the D2D discovery operation or the D2D communication session. In some embodiments, the eNB 104 may assist, manage, permit or facilitate the D2D discovery operation or the D2D communication session, although these embodiments are not limiting.

At operation 505 of the method 500, a D2D discovery status message may be transmitted for reception at the eNB 104 as part of an in-network communication session with the eNB 104. The D2D discovery status message may include bit fields, flags or other indicators that may describe a D2D discovery operation (current, past or future) at the UE 102. Although the bit fields, flags or other indicators may be Boolean, they are not limited as such, and may include additional information or quantities. As an example, the D2D discovery status message may indicate an initiation or termination of the D2D discovery operation at the UE 102. As another example, the D2D discovery status message may indicate if the UE 102 is announcing or monitoring as part of the D2D discovery operation.

As another example, these previous examples may be combined to form four possible status values—start announcing, stop announcing, start monitoring, and stop monitoring. It should be noted that the status value may refer to a current, past or future condition. For instance, if the UE 102 informs the eNB 104 of the "start announcing" state, the UE 102 may have already started announcing, may be about to start announcing or may be asking for permission to start announcing in the future. It should also be pointed out that it may be beneficial to the eNB 104 and to the system if the UE 102 informs the eNB 104 that it is (or was or will be) engaging in D2D discovery operation and a type of D2D discovery operation (announcement or monitoring). Accordingly, the eNB 104 may determine time and frequency resources to use for communication with the UE 102 as part of the in-network communication session. As an example, the eNB 104 may select the resources so as not to collide with D2D discovery operation at the UE 102.

in some embodiments, the transmission of the D2D discovery status message may occur while the UE is in a Radio Resource Control (RRC) connected mode or during an RRC connection setup procedure.

At operation 510, a D2D discovery resource request message may be transmitted for reception at the eNB 104 as part of the in-network communication session. In some embodiments, the transmission of the D2D discovery resource request message may be performed during non-contention based resource allocation in the system. The D2D discovery resource request message may serve to inform the eNB 104 that the UE 102 plans to perform D2D discovery operation, to seek permission of such from the eNB 104 or to request information related to time and/or frequency resources to use during the D2D discovery operation for transmission or reception of D2D discovery messages or other operations.

At operation 515, one or more D2D resource parameters may be received from the eNB 104. In some embodiments, the D2D resource parameters may be included in dedicated control messages for the UE 102. In some embodiments, the D2D resource parameters may be transmitted by the eNB 104 (in the dedicated control messages or otherwise) in response to the transmission of the D2D discovery resource request message by the UE 102 at operation 510 or in response to reception of the D2D discovery resource request message at the eNB 104. In some embodiments, the D2D resource parameters may be received in broadcast or other control messages received at the UE 102. As an example, the D2D resource parameters may be included in one or more System Information Blocks (SIBs) transmitted from the eNB 104. Such reception of the SIBs may be performed when resources are allocated according to a contention-based resource allocation. Such reception of the SIBs may also be performed when the UE 102 does not transmit a D2D discovery resource request message as in operation 510.

As an example, the D2D resource parameters may include time and/or frequency resources to use (at the UE 102) during the D2D discovery operation. As another example, the D2D resource parameters may include appropriate Resource Elements (REs) or Resource Blocks (RBs) for transmission of OFDM signals by the UE 102 as part of the requested or potential D2D discovery operation. The selection of those resources by the eNB 104 may be performed in a manner such that effects of the D2D discovery operation on other communication (such as in-network communication sessions) may be avoided or mitigated.

As another example, D2D resource parameters may include information about D2D discovery resources, in-network resources, measurement gaps or other information about neighboring or other eNBs. Accordingly, the D2D discovery operation may enable announcing and/or monitoring by the UE 102 for other UEs assigned to the neighboring or other eNBs, as will be described below.

At operation 520, a D2D discovery signal may be transmitted, as part of the D2D discovery operation, at the UE 102 for reception at one or more other UEs. The transmission may occur when the UE 102 is announcing or in an announcing mode. In some embodiments, the D2D discovery signal may be transmitted according to a transmission time and transmission frequency resources determined at least partly from the D2D resource parameters. As an example, the transmission time and transmission frequency resources may be selected to allow or enable reception at other UEs engaged in in-network communication with the same eNB 104 with which the UE 102 is engaged in-network communication. As another example, the transmission time and transmission frequency resources may be selected to allow or enable reception at other UEs engaged in in-network communication with a second, different eNB than the eNB 104 with which the UE 102 is engaged in in-network communication. In some embodiments, the D2D discovery signal may include patterns that enable detection through techniques such as correlation at other UEs. In some embodiments, the D2D discovery signal may include information or control bits that may be decoded by other UEs and may be related to the D2D discovery operation or to a related D2D communication session.

At operation 525, a second D2D discovery signal from a second UE may be received at the UE 102 as part of the D2D discovery operation. The reception may occur when the UE 102 is monitoring or in a monitoring mode. In some embodiments, the second D2D discovery signal may be received according to a reception time and reception frequency resources determined at least partly from the D2D resource parameters. For instance, although the discussion is not so limited, the scenario 400 in FIG. 4 may serve to illustrate these concepts. Accordingly, in this discussion above, the UE 102 may be the UE 425, the eNB 104 may be the eNB 405, and the second UE may be the UE 430. It should be noted that in this example, the UEs 425, 430 may both be assigned to the eNB 405.

In some embodiments, the D2D resource parameters received at operation 515 may include assistance information for D2D discovery resources of a second, different eNB, and the second UE may be engaged in an in-network communication session with the second eNB. In addition, the reception time and reception frequency resources for the reception of the second D2D discovery signal may be determined at least partly from the assistance information. In some embodiments, the assistance information may include information related to a measurement gap for the second eNB and the reception time for the reception of the second D2D discovery signal may be based at least partly on the measurement gap for the second eNB. Although the discussion is not so limited, the scenario 400 in FIG. 4 may serve to illustrate these concepts. Accordingly, in the discussion above, the UE 102 may be the UE 425, the eNB 104 may be the eNB 405, the second UE may be the UE 435, and the second eNB may be the eNB 415. It should be noted that the UEs 425, 435 are assigned to different eNBs, that is 405 and 415, respectively.

At operation 530, D2D packets may be transmitted and received over a direct link to the second UE as part of a D2D communication session. As previously described, these D2D packets may include voice, data or other packets. In some embodiments, the D2D communication session may be enabled through the D2D discovery operation previously described. That is, the D2D discovery operation may be at least partly for configuring the D2D communication session between the UE and the second UE (or one or more other UEs). In some embodiments, the transmission of D2D discovery signals during the D2D discovery operation may enable the UE 102 to announce its presence to other UEs located in close proximity. In some embodiments, the reception of D2D discovery signals transmitted by other UEs located in close proximity to the UE 102 may enable the UE 102 to discover the presence of the other UEs. Accordingly, the UE 102 may characterize a link for a potential D2D communication session with a second UE by measuring a signal level or signal quality during the reception of the D2D discovery signals from the second UE. In addition, the D2D discovery signals from the second UE may include control bits or control information that may enable the establishment of the D2D communication session. For instance, the control information may include an identifier of the second UE, the cell to which the second UE may be assigned or other similar information.

At operation 535, the UE 102 may receive packets from the eNB and may refrain from receiving D2D packets when the reception of D2D packets collides with the reception of packets from the eNB. Accordingly, the packets transmitted from the eNB 104 as part of the in-network communication session may be considered "prioritized" or of higher priority than the D2D packets transmitted by other UEs.

At operation 540, the UE 102 may transmit control packets for reception at the eNB and may refrain from transmitting D2D discovery signals when the transmission of D2D discovery signals collides with the transmission of control packets. As an example, the control packets may include a Channel Quality Indication (CQI), scheduling request, sounding reference signal or Hybrid ARQ feedback. Accordingly, the control packets transmitted for reception at the eNB 104 may be considered prioritized or of higher priority than the D2D discovery signals.

At operation 545, an integrity failure notification may be transmitted for reception at the eNB 104. The transmission of the integrity failure notification may be performed in response to a detection of a failure of a first integrity for the D2D communication session. In some embodiments, D2D packets transmitted as part of the D2D communication session may be transmitted according to the first integrity for the D2D communication session based at least partly on a first Message Authentication Code (MAC) generated at least partly from a first counter value. The UE 102 may receive, from the eNB, a second counter value and may generate a second MAC, based at least partly on the second counter value, to enable a second integrity for the D2D communication session.

Referring back to FIG. 2, the UE 102 may include an application layer 210, an RRC layer 214, and a NAS layer 212. In some embodiments, the transmission time and the transmission frequency resources for the transmission of the D2D discovery signal at the UE 102 may be determined at least partly at the RRC layer 214. In some embodiments, the RRC layer 214 may be configured by the NAS layer 212 to transmit the D2D discovery signal in response to a reception at the NAS layer 212 of a D2D discovery enabling command from the application layer 210. Embodiments are not limited as such, however, and the UE 102 may include a different architecture that does not necessarily include all of the application layer 210, RRC layer 214, and NAS layer 212 as shown in FIG. 2.

Figure 6:
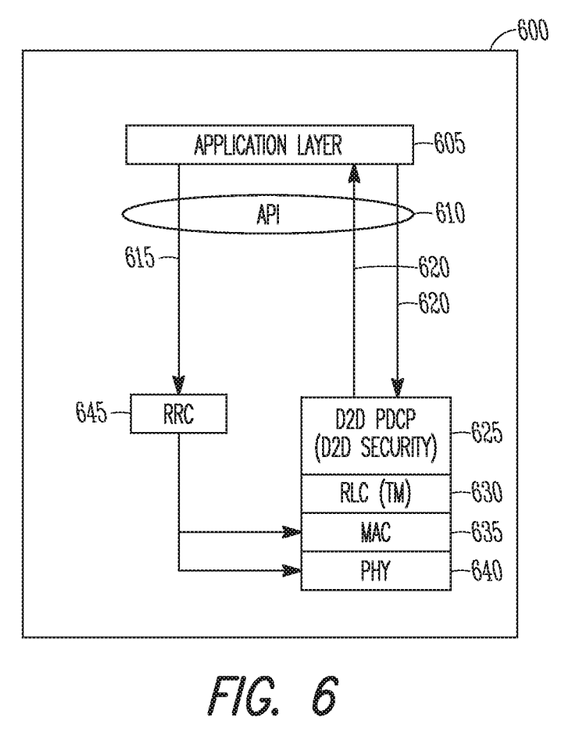
FIG. 6 illustrates an example of a LTE architecture in accordance with some embodiments.

Referring to FIG. 6, an example of a UE architecture 600 that may support D2D discovery operation and D2D communication is shown. The UE architecture 600 may include some or all of an Application Layer 605, an Application Programming Interface (API) 610, a D2D Packet Data Convergence Protocol (PDCP) 625, a Radio Link Protocol (RLP) 630, a MAC layer 635, a PHY layer 640, and an RRC layer 645, which may be similar to corresponding layers shown in FIG. 2 in some embodiments.

The API 610 may enable communication between the Application Layer 605 and other layers shown. As an example, the RRC layer 645 may receive an enabling or disabling command for D2D discovery from the Application Layer 605 through the interface 615, and may control the overall D2D discovery operation. In some embodiments, the enabling command may indicate or request the RRC Layer 645 to start announcement or monitoring as part of D2D discovery operation and the disabling command may indicate or request the RRC Layer 645 to stop announcement or monitoring as part of D2D discovery operation. As another example, D2D discovery information, such as a D2D Identity or a D2D Application Identity, may be delivered from the Application Layer 605 to the PDCP 625 through the interface 620. The D2D discovery information may also be delivered to the RRC Layer 645 from the Application Layer 605 through the interface 615, and may be included as part of the enabling or disabling command previously described. In some embodiments, the RRC Layer 645 may initiate one or more RRC procedures to obtain D2D resource parameters, as previously described. In some embodiments, the RRC Layer 645 may determine D2D discovery channels for transmission and reception of D2D discovery signals. For instance, the RRC Layer 645 may determine time and frequency resources on which to transmit or receive D2D discovery signals, which may be based at least partly on the D2D discovery information, as previously described.

Figure 7:
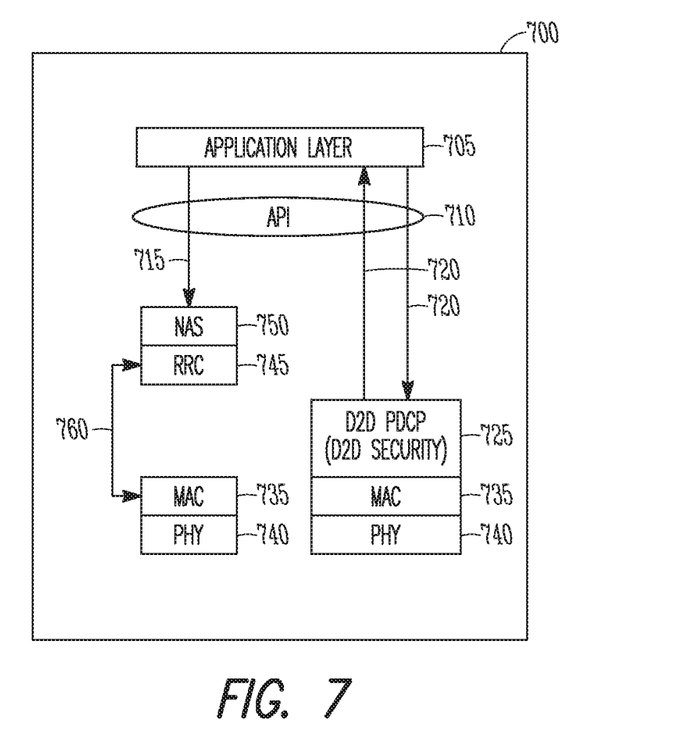
FIG. 7 illustrates another example of a UE architecture in accordance with some embodiments.

Referring to FIG. 7, another example of a UE architecture 700 that may support D2D discovery operation and D2D communication is shown. The UE architecture 700 may include some or all of an Application Layer 705, an API 710, a D2D PDCP 725, a MAC layer 735, a PHY layer 740, an RRC layer 745, and an NAS layer 750. These layers may be similar to corresponding layers shown in FIG. 2 or in FIG. 6 in some embodiments.

Some of the techniques and operations discussed regarding the UE architecture 600 of FIG. 6 may be applied to the UE architecture 700 in some embodiments. In addition, the NAS layer 750 may receive an enabling or disabling command for D2D discovery from the Application Layer 705 through the interface 715, and may control the overall D2D discovery operation. In some embodiments, the NAS layer 750 may indicate or request the RRC Layer 745 to initiate one or more RRC procedures to obtain D2D resource parameters and/or determine D2D discovery channels for transmission and reception of D2D discovery signals, as previously described. In some embodiments, the RRC layer 745 may be communicatively coupled to the MAC 735 and/or PHY 740 through the interface 760, which may be a Control SAP interface, as known in the art.

A User Equipment (UE) to operate in accordance with a device-to-device (D2D) communication mode is disclosed herein. In some embodiments, the UE may be further to operate in accordance with proximity-based services (ProSe). The UE may include hardware circuitry to receive, as part of an in-network communication session, one or more D2D resource parameters from an Evolved Node-B (eNB). The hardware processing circuitry may be further to transmit, as part of the in-network communication session, a D2D discovery status message for a D2D discovery operation at the UE. The hardware processing circuitry may be further to transmit, as part of the D2D discovery operation, a D2D discovery signal for reception at one or more other UEs. In some embodiments, the D2D discovery signal may be transmitted according to a transmission time and transmission frequency resources determined at least partly from the D2D resource parameters. In some embodiments, the D2D discovery status message may indicate an initiation or termination of the D2D discovery operation at the UE and the D2D discovery status message may indicate if the UE is announcing or monitoring as part of the D2D discovery operation. In some embodiments, the transmission of the D2D discovery status message may occur while the UE is in a Radio Resource Control (RRC) connected mode or during an RRC connection setup procedure.

The hardware circuitry may be further to receive, as part of the D2D discovery operation, a second D2D discovery signal from a second UE. In some embodiments, the second D2D discovery signal may be received according to a reception time and reception frequency resources determined at least partly from the D2D resource parameters. In some embodiments, the D2D resource parameters may include assistance information for D2D discovery resources of a second, different eNB. In some embodiments, the second UE may be engaged in an in-network communication session with the second eNB. In some embodiments, the reception time and reception frequency resources for the reception of the second D2D discovery signal may be determined at least partly from the assistance information. In some embodiments, the assistance information may include information related to a measurement gap for the second eNB and the reception time for the reception of the second D2D discovery signal may be based at least partly on the measurement gap for the second eNB.

The hardware processing circuitry may be further to transmit, as part of the in-network communication session, a D2D discovery resource request message for reception at the eNB. In some embodiments, the D2D discovery resource parameters received from the eNB may be included in one or more System Information Blocks (SIBs) transmitted from the eNB. In some embodiments, the D2D discovery operation may be at least partly for configuring a D2D communication session between the UE and one or more other UEs. The hardware processing circuitry may be further to transmit and receive D2D packets over a direct link to a second UE as part of the D2D communication session. The hardware processing circuitry may be further to receive packets from the eNB as part of the in-network communication session and, when the reception of D2D packets collides with the reception of packets from the eNB, refrain from receiving the D2D packets. The hardware processing circuitry may be further to transmit control packets for reception at the eNB as part of the in-network communication session and, when transmission of D2D discovery signals collides with the transmission of control packets, refrain from transmitting the D2D discovery signals.

In some embodiments, the transmitted D2D packets may be transmitted according to a first integrity for the D2D communication session based at least partly on a first Message Authentication Code (MAC) generated at least partly from a first counter value. The hardware processing circuitry may be further to transmit, for reception at the eNB, an integrity failure notification in response to a detection of a failure of the first integrity for the D2D communication session. The hardware processing circuitry may be further to receive, from the eNB, a second counter value and generate a second MAC, based at least partly on the second counter value, to enable a second integrity for the D2D communication session.

In some embodiments, the UE may include an application layer, a Radio Resource Control (RRC) layer and a Non-Access Stratum (NAS) layer. In some embodiments, the transmission time and the transmission frequency resources for the transmission of the D2D discovery signal may be determined at least partly at the RRC layer and the RRC layer may be configured by the NAS layer to transmit the D2D discovery signal in response to a reception at the NAS layer of a D2D discovery enabling command from the application layer.

A non-transitory computer-readable storage medium that stores instructions for execution by one or more processors to perform operations for communication in a device-to-device (D2D) mode is also disclosed herein. The operations may configure the one or more processors to receive, as part of an in-network communication session, one or more D2D resource parameters from an Evolved Node-B (eNB). The operations may further configure the one or more processors to transmit, as part of the in-network communication session, a D2D discovery status message for a D2D discovery operation at the UE. The operations may further configure the one or more processors to transmit, as part of the D2D discovery operation, a D2D discovery signal for reception at one or more other UEs. In some embodiments, the D2D discovery signal may be transmitted according to a transmission time and transmission frequency resources determined at least partly from the D2D resource parameters. In some embodiments, the D2D discovery status message may indicate an initiation or termination of the D2D discovery operation at the UE. In some embodiments, the D2D discovery status message may indicate if the UE is announcing or monitoring as part of the D2D discovery operation.

In some embodiments, the transmission of the D2D discovery status message may occur while the UE is in a Radio Resource Control (RRC) connected mode or during an RRC connection setup procedure. The operations may further configure the one or more processors to receive, as part of the D2D discovery operation, a second D2D discovery signal from a second UE. In some embodiments, the D2D resource parameters may include assistance information for D2D discovery resources of a second, different eNB. In some embodiments, the second UE may be engaged in an in-network communication session with the second eNB. In some embodiments, the reception time and reception frequency resources for the reception of the second D2D discovery signal may be determined at least partly from the assistance information. In some embodiments, the assistance information may include information related to a measurement gap for the second eNB and the reception time for the reception of the second D2D discovery signal may be based at least partly on the measurement gap for the second eNB. In some embodiments, the D2D discovery operation may be at least partly for configuring a D2D communication session between the UE and one or more other UEs. The operations may further configure the one or more processors to transmit and receive D2D packets over a direct link to a second UE as part of the D2D communication session.

A method of communicating in a device-to-device (D2D) mode is also disclosed herein. The method may include receiving, as part of an in-network communication session, one or more D2D resource parameters from an Evolved Node-B (eNB). The method may also include transmitting, as part of the in-network communication session, a D2D discovery status message for a D2D discovery operation at the UE. The method may also include transmitting, as part of the D2D discovery operation, a D2D discovery signal for reception at one or more other UEs. In some embodiments, the D2D discovery signal may be transmitted according to a transmission time and transmission frequency resources determined at least partly from the D2D resource parameters. In some embodiments, the D2D discovery status message may indicate an initiation or termination of the D2D discovery operation at the UE. In some embodiments, the D2D discovery status message may indicate if the UE is announcing or monitoring as part of the D2D discovery operation. In some embodiments, the transmission of the D2D discovery status message may occur while the UE is in a Radio Resource Control (RRC) connected mode or during an RRC connection setup procedure. The method may further include receiving, as part of the D2D discovery operation, a second D2D discovery signal from a second UE. In some embodiments, the D2D resource parameters may include assistance information for D2D discovery resources of a second, different eNB. In some embodiments, the second UE may be engaged in an in-network communication session with the second eNB. In some embodiments, the reception time and reception frequency resources for the reception of the second D2D discovery signal may be determined at least partly from the assistance information. In some embodiments, the assistance information may include information related to a measurement gap for the second eNB and the reception time for the reception of the second D2D discovery signal may be based at least partly on the measurement gap for the second eNB. The method may further include transmitting and receiving D2D packets over a direct link to a second UE as part of a D2D communication session between the UE and one or more other UEs. In some embodiments, the D2D discovery operation may be at least partly for configuring the D2D communication session.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a User Equipment (UE) to operate in accordance with a direct discovery communication mode, comprising:
processing circuitry configured to:
decode, from a broadcast message received from an Evolved Node B (eNB), a system information block (SIB), wherein the SIB comprises one or more system information parameters to indicate one or more frequencies for use in the direct discovery communication mode, and wherein during the direct discovery communication mode, the UE is configured to directly communicate with a second UE;

during a Radio Resource Control (RRC) connected mode,
   initiate a transmission of a message to the eNB to
   initiate the direct discovery communication mode and
   to request assignment of dedicated resources for the
   direct discovery communication mode, the dedicated
   resources including one or more frequencies indicated
   by the one or more system information parameters; and
encode a discovery signal for transmission to the second
   UE on the dedicated resources during the direct discovery communication mode; and
memory configured to store the one or more system
   information parameters.

2. The apparatus of claim 1, wherein the processing circuitry is configured to utilize one or more frequencies, indicated by the one or more system information parameters of the SIB, to monitor one or more additional discovery signals.

3. The apparatus of claim 2, wherein the processing circuitry is configured to configure the UE to receive an additional discovery signal on the dedicated resources.

4. The apparatus of claim 1, wherein during RRC connected mode, the processing circuitry is configured to initiate the transmission of the message to the eNB to terminate the direct discovery communication mode and to release an assignment of the dedicated resources for the direct discovery communication mode.

5. The apparatus of claim 3, wherein the additional discovery signal is a discovery signal from the second UE.

6. The apparatus of claim 1, wherein the message indicates whether the UE is to announce or monitor as part of the direct discovery communication mode.

7. The apparatus of claim 1, wherein the apparatus initiates the transmission of the message to the eNB during an RRC connection setup procedure.

8. A non-transitory computer-readable hardware storage device that stores instructions for execution by one or more processors of a station (STA), the instructions to configure the one or more processors to:
   decode, from a broadcast message received from an
      Evolved Node B (eNB), a system information block
      (SIB), wherein the SIB comprises one or more system
      information parameters to indicate one or more frequencies for use in the direct discovery communication mode, and wherein during the direct discovery communication mode, the UE is configured to directly communicate with a second UE;
   during a Radio Resource Control (RRC) connected mode,
      initiate a transmission of a message to the eNB to
      initiate the direct discovery communication mode and
      to request assignment of dedicated resources for the
      direct discovery communication mode, the dedicated
      resources including one or more frequencies indicated
      by the one or more system information parameters; and
   encode a discovery signal for transmission to the second
      UE on the dedicated resources during the direct discovery communication mode.

9. The non-transitory computer-readable hardware storage device of claim 8, wherein the instructions are to further configure the one or more processors to utilize one or more frequencies, indicated by the one or more system information parameters of the SIB, to monitor one or more additional discovery signals.

10. The non-transitory computer-readable hardware storage device of claim 9, wherein the instructions are to further configure the one or more processors to configure the UE to receive an additional discovery signal on the dedicated resources.

11. The non-transitory computer-readable hardware storage device of claim 8, wherein during RRC connected mode, the instructions are to further configure the one or more processors to initiate the transmission of the message to the eNB to terminate the direct discovery communication mode and to release an assignment of the dedicated resources for the direct discovery communication mode.

12. The non-transitory computer-readable hardware storage device of claim 10, wherein the additional discovery signal is a discovery signal from the second UE.

13. The non-transitory computer-readable hardware storage device of claim 8, wherein the message indicates whether the UE is to announce or monitor as part of the direct discovery communication mode.

14. The non-transitory computer-readable hardware storage device of claim 8, wherein the instructions are to further configure the one or more processors to initiate the transmission of the message to the eNB during an RRC connection setup procedure.

15. A method of direct discovery communication, the method comprising:
   decoding, from a broadcast message received from an
      Evolved Node B (eNB), a system information block
      (SIB), wherein the SIB comprises one or more system
      information parameters to indicate one or more frequencies for use in the direct discovery communication mode, and wherein during the direct discovery communication mode, a UE is configured to directly communicate with a second UE;
   during a Radio Resource Control (RRC) connected mode,
      initiate a transmission of a message to the eNB to
      initiate the direct discovery communication mode and
      to request assignment of dedicated resources for the
      direct discovery communication mode, the dedicated
      resources including one or more frequencies indicated
      by the one or more system information parameters; and
   encode a discovery signal for transmission to the second
      UE on the dedicated resources during the direct discovery communication mode.

16. The method of claim 15, further comprising utilizing one or more frequencies, indicated by the one or more system information parameters of the SIB, to monitor one or more additional discovery signals.

17. The method of claim 16, further comprising receiving an additional discovery signal on the dedicated resources.

18. The method of claim 15, further comprising initiating, during RRC connected mode, the transmission of the message to the eNB to terminate the direct discovery communication mode and to release an assignment of the dedicated resources for the direct discovery communication mode.

19. The method of claim 17, wherein the additional discovery signal is a discovery signal from the second UE.

20. A system comprising:
   an Evolved Node B (eNB); and
   a User Equipment (UE), the UE configured to:
      decode, from a broadcast message received from the eNB,
         a system information block (SIB), wherein the SIB
         comprises one or more system information parameters
         to indicate one or more frequencies for use in the direct
         discovery communication mode, and wherein during
         the direct discovery communication mode, the UE is
         configured to directly communicate with a second UE;
      during a Radio Resource Control (RRC) connected mode,
         initiate a transmission of a message to the eNB to
         initiate the direct discovery communication mode and
         to request assignment of dedicated resources for the
         direct discovery communication mode, the dedicated resources including one or more frequencies indicated by the one or more system information parameters; and encode a discovery signal for transmission to the second UE on the dedicated resources during the direct discovery communication mode.

* * * * *